US012555420B2

(12) United States Patent
Alastair-Hunter

(10) Patent No.: US 12,555,420 B2
(45) Date of Patent: Feb. 17, 2026

(54) ADAPTER AND CIRCUIT FOR DIAGNOSTIC OVER INTERNET PROTOCOL COMMUNICATION

(71) Applicant: Robert Bosch GmbH, Stuttgart (DE)

(72) Inventor: Tyrel Alastair-Hunter, Owatonna, MN (US)

(73) Assignees: Bosch Automotive Service Solutions Inc., Warren, MI (US); Robert Bosch GmbH, Stuttgart (DE)

(*) Notice: Subject to any disclaimer, the term of this patent is extended or adjusted under 35 U.S.C. 154(b) by 245 days.

(21) Appl. No.: 18/544,803

(22) Filed: Dec. 19, 2023

(65) Prior Publication Data
US 2025/0201038 A1 Jun. 19, 2025

(51) Int. Cl.
G07C 5/08 (2006.01)
H04L 12/40 (2006.01)

(52) U.S. Cl.
CPC ............ *G07C 5/0808* (2013.01); *H04L 12/40* (2013.01); *H04L 2012/40273* (2013.01)

(58) Field of Classification Search
CPC ... G07C 5/0808; G07C 2205/02; H04L 12/40; H04L 2012/40273; G06F 13/382
See application file for complete search history.

(56) References Cited

U.S. PATENT DOCUMENTS

2025/0088575 A1* 3/2025 Zachos ............ H04L 12/40169

OTHER PUBLICATIONS

ISO 13400-4:2016, Road vehicles, Diagnostic communication over Internet Protocol (DoIP), Part 4: Ethernet-based high-speed data link connector, Publication date : Mar. 2016.

* cited by examiner

*Primary Examiner* — Michael V Kerrigan
(74) *Attorney, Agent, or Firm* — David Kovacek

(57) ABSTRACT

An adapter to be used for diagnostics over internet protocol (DOIP) compatible vehicle diagnostic systems, providing interconnectivity between the diagnostic bus of a vehicle and a diagnostic processor. The adapter transfers a DOIP signal from a first connector to another format. Some embodiments transfer the DOIP signal to a second connector for hardwired communication, such as an Ethernet-compatible connector. Some embodiments transfer the DOIP signal to a wireless signal, such as a Wi-Fi compatible signal, for wireless communication with the diagnostic processor.

20 Claims, 9 Drawing Sheets

ADAPTER AND CIRCUIT FOR DIAGNOSTIC OVER INTERNET PROTOCOL COMMUNICATION

TECHNICAL FIELD

This disclosure relates to vehicular diagnostics. More specifically, this disclosure relates to interconnections between a diagnostic processor and a processor of a vehicle utilizing a diagnostics over internet protocol (DOIP) diagnostics protocol.

BACKGROUND

Diagnostics over internet protocol (DOIP) is an emerging communication protocol for vehicle diagnostic hardware. Currently, DOIP connections to diagnostic processors for diagnostics or installation during manufacture rely upon a vehicle communication interface (VCI) to establish data communication between the diagnostic bus of a vehicle and an external processor. However, external processors for installation and diagnostics are sufficiently fast to translate DOIP signals suitable for utilization. Eliminating the need for a VCI processor in the connection between the vehicle's diagnostic bus can reduce complexity and cost in systems used for vehicle diagnostics and installation.

What is desired is an interconnect between a vehicle's diagnostic bus and a diagnostic processor that does not utilize a VCI processor.

SUMMARY

One aspect of this disclosure is directed to a diagnostic over internet protocol (DOIP) adapter. The adapter comprises a first connector, a second connector, a comparator circuit, and a multiplexing circuit. The first connector has a set of first pins and is configured to interface with a vehicle diagnostic bus utilizing a DOIP protocol. The second connector has a set of second pins and is configured to interface with a diagnostic processor. The comparator circuit is configured to generate a control signal indicating a DOIP pin configuration received by the first connector. The multiplexing circuit is configured to selectively connect one of the first pins to one of the second pins in response to the control signal. A subset of the first pins is connected to a corresponding subset of the second pins independently of the condition of the multiplexing circuit. In some embodiments, the first connector comprises a J1962 connector. In some embodiments, the second connector is a RJ45 connector.

Another aspect of this disclosure is directed to a diagnostic over internet protocol (DOIP) adapter, the adapter comprising a first connector, a multipin transceiver, a comparator circuit, and a multiplexing circuit. The first connector has a plurality of first pins and is configured to interface with a vehicle diagnostic bus utilizing a DOIP protocol. The multipin transceiver circuit has a set of second pins and is configured to wirelessly transmit and receive data with a diagnostic processor external to the vehicle. The comparator circuit is configured to generate a switching signal indicating a DOIP pin configuration received by the first connector. The multiplexing circuit is configured to selectively connect one of the first pins to one of the second pins in response to the switching signal. At least one of the first pins is connected to a corresponding one of the second pins independently of the multiplexing circuit. In some embodiments, the multipin transceiver is configured to establish communication with the diagnostic processor utilizing a local area network (LAN) protocol, such as a Wi-Fi protocol. In some embodiments, the multipin transceiver is configured to establish communication with the diagnostic processor utilizing a personal area network protocol, such as a Bluetooth protocol.

A further aspect of this disclosure is directed to a diagnostic system comprising a diagnostic processor and a diagnostics over internet protocol (DOIP) adapter. The diagnostic processor is suitable to communicate with a vehicle utilizing a DOIP protocol. The DOIP adapter comprises a first connector, a second connector, a comparator circuit, and a multiplexing circuit. The first connector has a set of first pins and is configured to interface with a vehicle diagnostic bus utilizing a DOIP protocol. The second connector has a set of second pins and is configured to interface with a diagnostic processor. The comparator circuit is configured to generate a control signal indicating a DOIP pin configuration received by the first connector. The multiplexing circuit is configured to selectively connect one of the first pins to one of the second pins in response to the control signal. A subset of the first pins is connected to a corresponding subset of the second pins independently of the multiplexing circuit.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
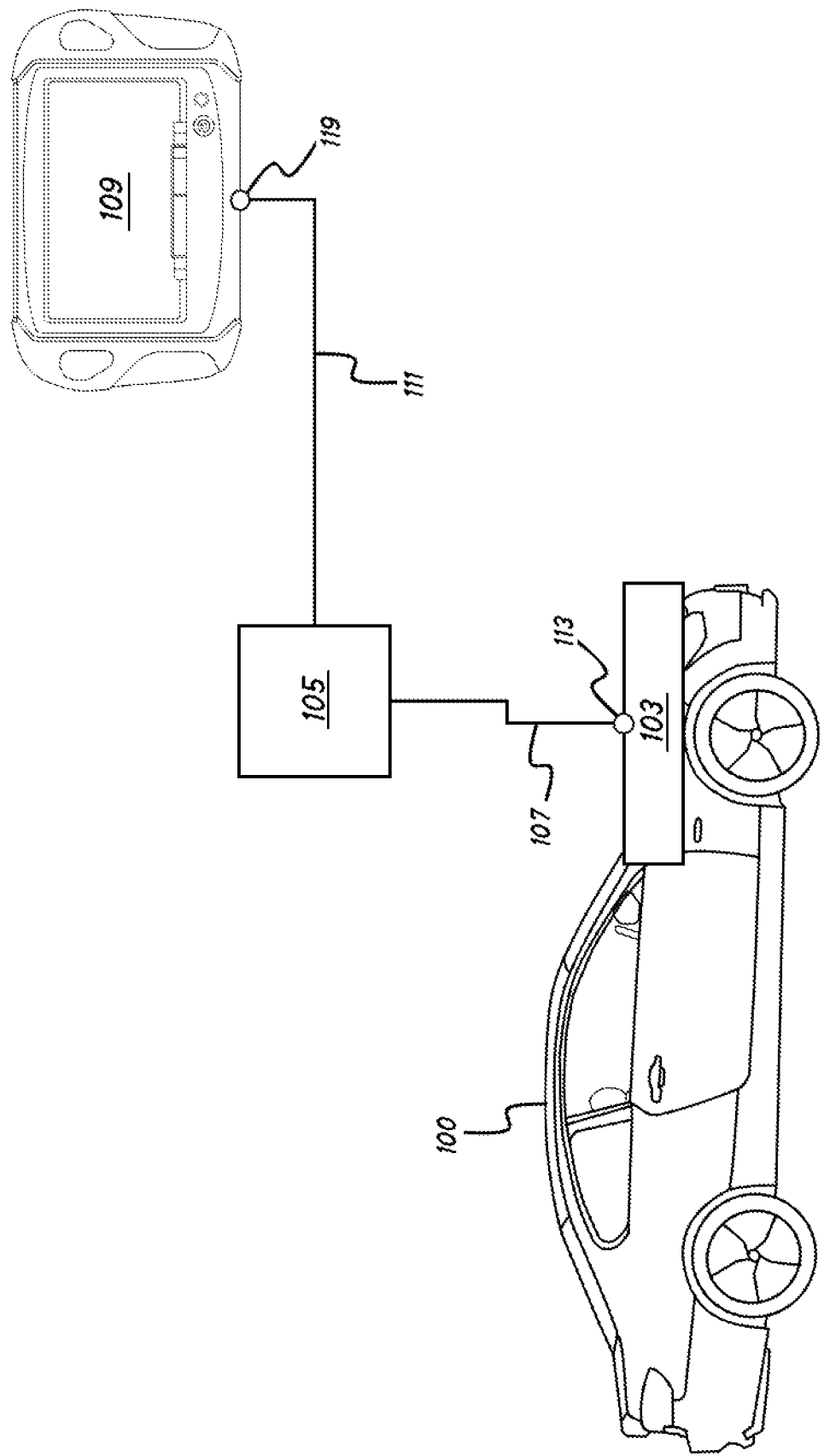
FIG. 1 is a diagrammatic illustration of a diagnostic system.

FIG. 1 is a diagrammatic illustration of a diagnostics system utilizing a diagnostics over internet protocol (DOIP)

protocol. A vehicle 100 comprises a diagnostic bus 103 that utilizes a DOIP protocol. Diagnostic bus 103 is in data communication with a vehicle communication interface (VCI) 105 via a first connection 107. VCI 105 then transfers data to a diagnostic processor 109 via a second connection 111. VCI 105 similarly transfers data and commands in the reverse direction: starting from diagnostic processor 109 and delivering to diagnostic bus 103. The diagnostic system utilizes a first connector 113 to interface with diagnostic bus 103, and a second connector 119 to interface with diagnostic processor 119.

In the depicted embodiment, first connector 113 may conform to an established vehicle diagnostics standard, such as an onboard diagnostics (OBD) connector conforming to a J1962 specification. Other embodiments may comprise other connector types suitable for use with vehicles having other diagnostic ports conforming to different standards without deviating from the teachings disclosed herein.

In the depicted embodiment, second connector 119 may conform to an established data transmission standard, such as an Ethernet connector conforming to an RJ45 specification, suitable for various types of Ethernet communication. By way of example, and not limitation, second connection 111 may utilize a category 5 ("CAT5") or category 6 ("CAT6") twisted-pair wire specification, but other embodiments may utilize other connectors or cable types for transmission without deviating from the teachings disclosed herein.

In the depicted embodiment, diagnostic processor 109 comprises a diagnostic tablet tool, but other embodiments may comprise other processor configurations without deviating from the teachings disclosed herein.

Diagnostic processor 109 may be embodied as a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art. Advantageously, in embodiments where Diagnostic processor 109 comprises a general-purpose computing device (a so-called "off-the-shelf" device)—such as a desktop computer, laptop computer, tablet computer, or smartphone—the overall cost of the diagnostic system can be reduced compared to a specialized hardware embodiment. In the teachings herein, any embodiment of diagnostic processor 109 shall be understood to have a data port or wireless-enabled element suitable to exchange data.

In the depicted embodiment, VCI 105 comprises a microprocessor element, which is utilized to transfer DOIP-formatted data suitable for diagnostic bus 103 to Ethernet-formatted data suitable for diagnostic processor 109 and vice-versa. Microprocessor elements can be expensive compared to other solutions contemplated utilizing configurations having less complexity and lower cost.

Figure 2:
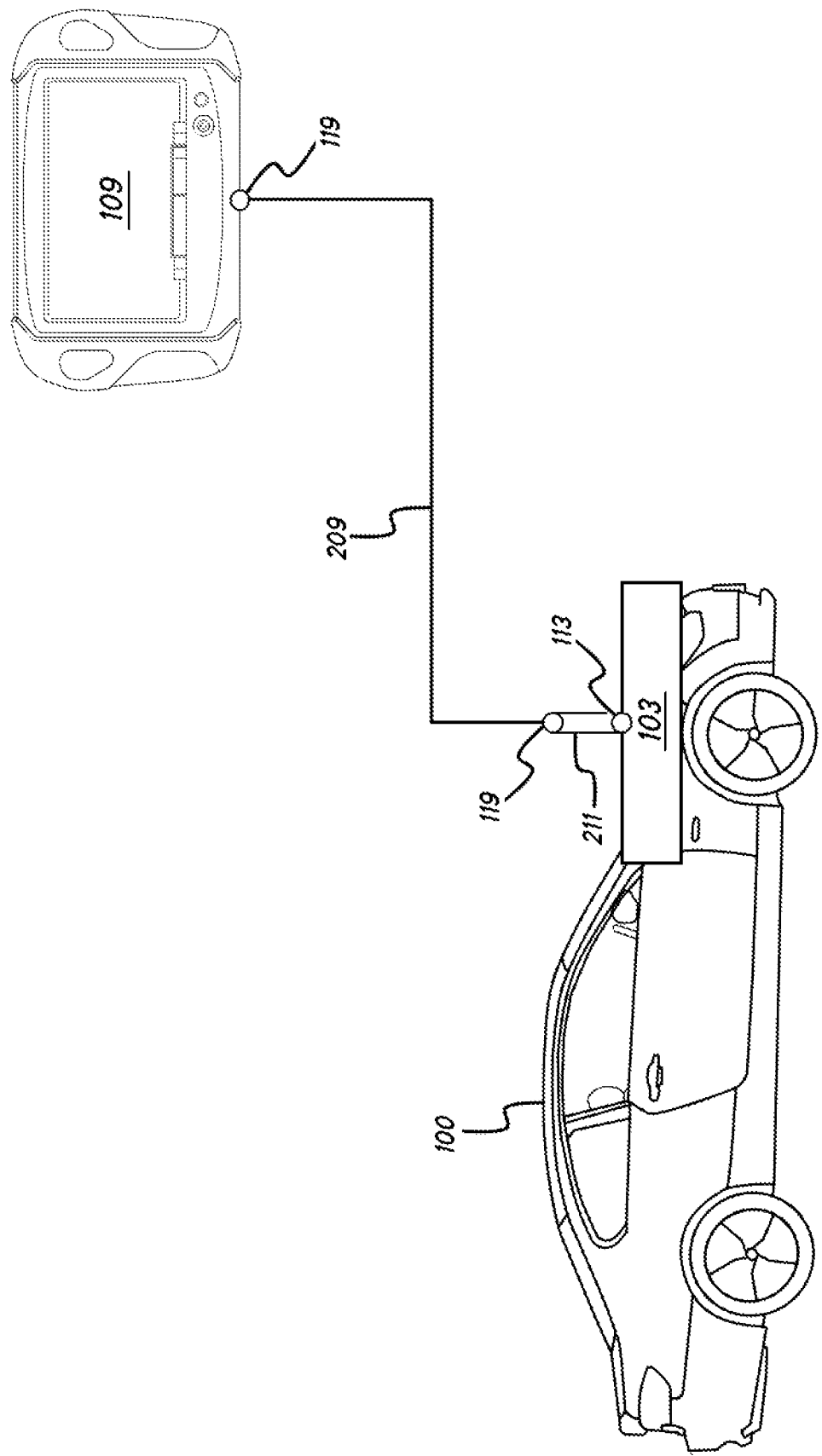
FIG. 2 is a diagrammatic illustration of a diagnostic system utilizing a DOIP adapter.

FIG. 2 is a diagrammatic illustration of a diagnostic system according to the teachings disclosed herein that does not utilize a VCI (such as VCI 105; see FIG. 1). Instead, diagnostic processor 109 is configured to receive DOIP signals directly as transmitted by diagnostic bus 103. This direct transmission advantageously reduces latency of the transmission because the microprocessor of a VCI is no longer required to read and re-transmit the DOIP data to the diagnostic processor 109. Diagnostic processor 109 additionally can receive the DOIP signals via a less-expensive conventional transmission port, such as an RJ45 port (not shown). These conventional transmission ports can reduce the costs of the diagnostic system by utilizing inexpensive transmission media for a data communication connection 209 that transmits between diagnostic bus 103 and diagnostic processor 109. However, because the diagnostic bus 103 is accessible using a first connector 113 and the diagnostic processor is accessible via a second connector 119, an adapter 211 is utilized to transfer the DOIP signals between diagnostic bus 103 and diagnostic processor 109 and vice-versa. Because a DOIP signal can be expected, a relatively-expensive microprocessor of a VCI need not be used, as the DOIP protocol specification makes it possible to build a functional DOIP adapter 211 out of passive electronics and integrated circuits.

In the depicted embodiment, connection 209 comprises an Ethernet-compatible cable having matching second connectors 119 on either end. This implementation advantageously permits the system to utilizing readily-available and inexpensive Ethernet-compatible cables during operation of the diagnostic system, but other embodiments may comprise other configurations utilizing different transmission media or connectors without deviating from the teachings disclosed herein.

Figure 3:
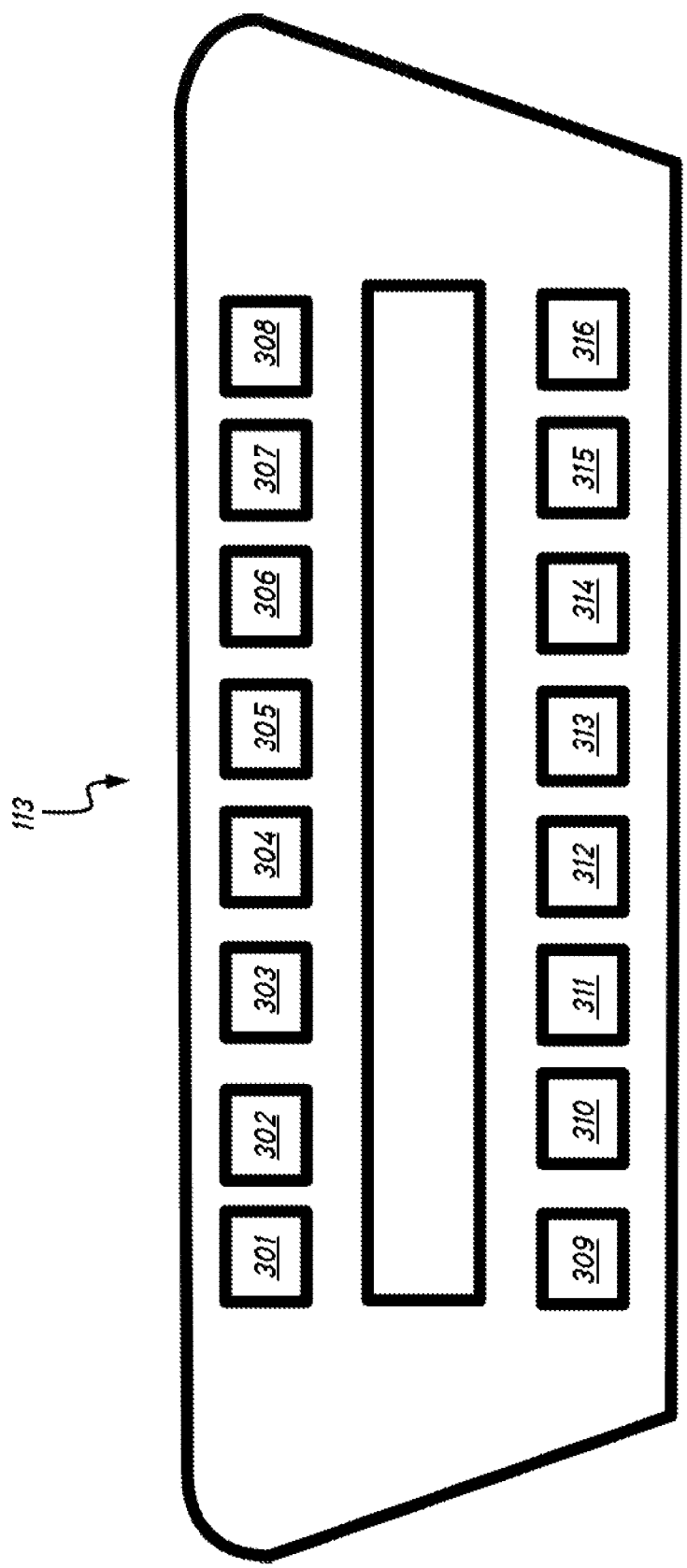
FIG. 3 is a pinout diagram for a connector conforming to a J1962 specification.

In the depicted embodiment, adapter 211 comprises first connector 113. FIG. 3 is a pinout diagram of first connector 113 for embodiments where first connector 113 conforms to a J1962 specification. In addition to the shape of the connector, it is important to note that the individual pin designations of first connector 113 are specified in the J1962 specification. This designation permits interoperability of components and compatibility with a DOIP protocol. In the depicted embodiment, first connector 113 comprises Pin 1 301, Pin 2 302, Pin 3 303, Pin 4 304, Pin 5 305, Pin 6 306, Pin 7 307, Pin 8 308, Pin 9 309, Pin 10 310, Pin 11 311, Pin 12 312, Pin 13 313, Pin 14 314, Pin 15 315, and Pin 16 316. It is additionally noted that though this disclosure will generally conform to the "Pin X" nomenclature, each of the designated pins may be referred to using ordinal terms: Pin 1 301 is synonymous with "first pin 301," Pin 2 302 is synonymous with "second pin 302," and so on for all the designated pins. It is additionally noted still that though this disclosure will generally conform to the "Pin X" nomenclature, each of the designated pins may be referred to utilizing their indicated designation within FIG. 3: Pin 1 301 is synonymous with "pin 301," Pin 2 302 is synonymous with "pin 302," and so on for all the designated pins.

Figure 4:
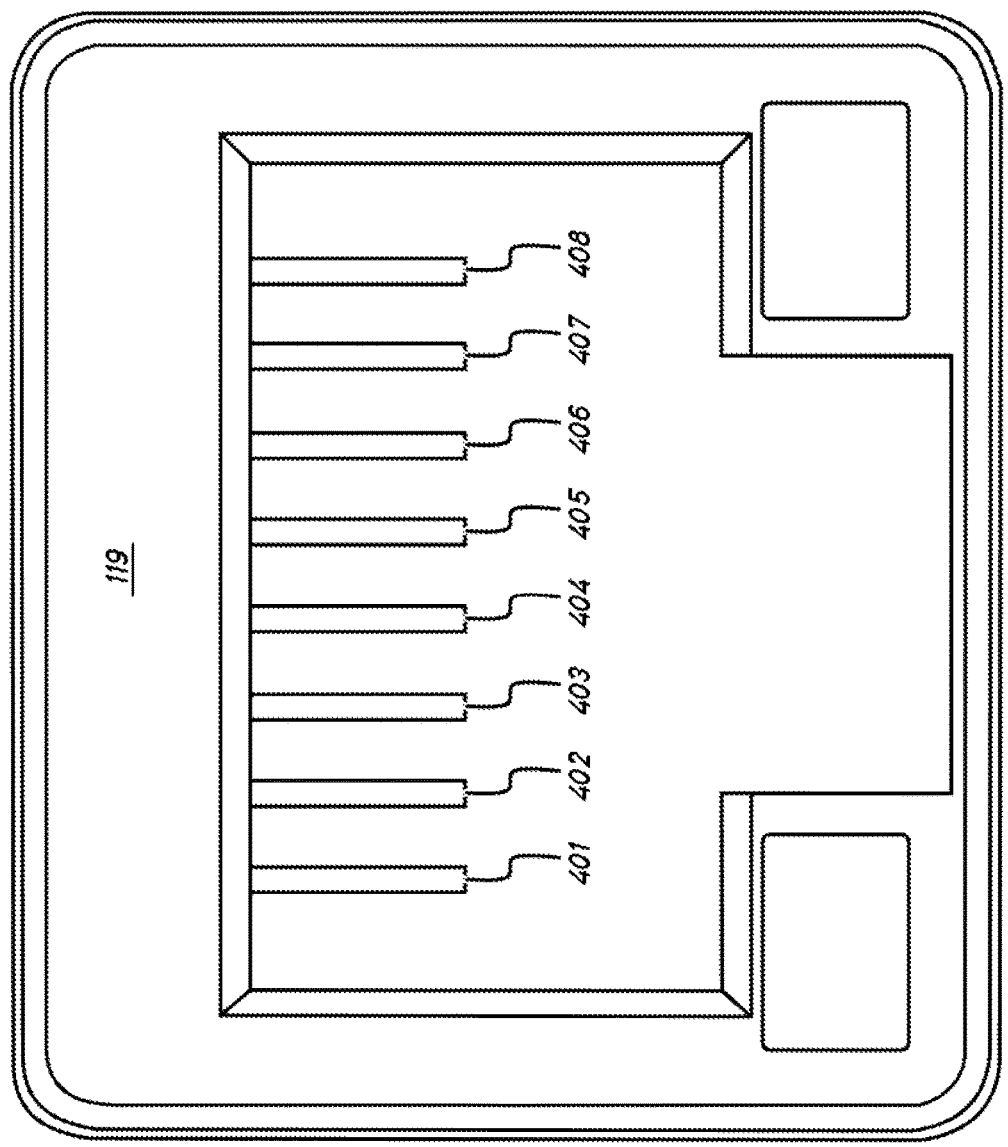
FIG. 4 is a pinout diagram for a connector conforming to an RJ45 specification.

In the depicted embodiment, adapter 211 (see FIG. 2) comprises second connector 119. FIG. 4 is a pinout diagram of second connector 119 for embodiments where second connector 119 conforms to an RJ45 specification. In addition to the shape of the connector, it is important to note that the individual pin designations of second connector 113 are specified in the RJ45 specification. In the depicted embodiment, second connector 119 comprises Pin 1 401, Pin 2 402, Pin 3 403, Pin 4 404, Pin 5 405, Pin 6 406, Pin 7 407, and Pin 8 408. It is additionally noted that though this disclosure will generally conform to the "Pin X" nomenclature, each of the designated pins may be referred to using ordinal terms: Pin 1 401 is synonymous with "first pin 401," Pin 2 402 is synonymous with "second pin 402," and so on for all the designated pins. It is additionally noted still that though this disclosure will generally conform to the "Pin X" nomenclature, each of the designated pins may be referred to utilizing their indicated designation within FIG. 3: Pin 1 401 is synonymous with "pin 401," Pin 2 402 is synonymous with "pin 402," and so on for all the designated pins.

Successful implementation of a diagnostics system utilizing DOIP protocols requires adhering to electrical signals transmitted upon the particular pins specified for each of the connectors designed by the standard specification.

Figure 5:
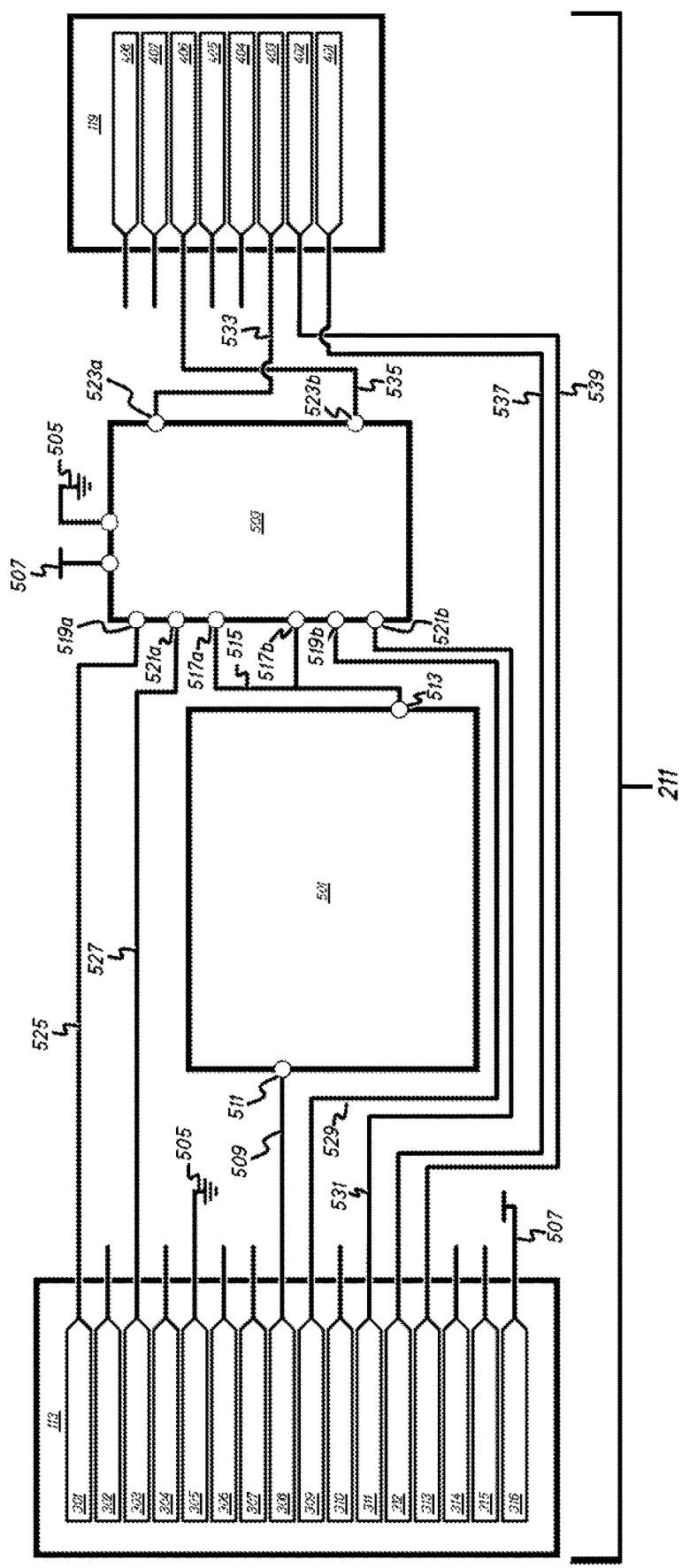
FIG. 5 is a circuit diagram illustrating an adapter circuit to connect a vehicle diagnostics bus with a diagnostic processor utilizing a DOIP protocol.

FIG. 5 is a circuit diagram illustrating the electrical connections of adapter 211 between first connector 113 and second connector 119. In the depicted embodiment, not all of pins 301-316 or pins 401-408 are necessarily connected to other parts of the adapter 211, but other embodiments may comprise optional connections for one or more of the unused pins without deviating from the teachings disclosed herein.

In the depicted embodiment, adapter 211 comprises a comparator circuit 501 and a multiplexing circuit 503. It is additionally noted that in the depicted embodiment, electric ground (also referred to as "earth" or "neutral") 505 is established via Pin 5 305 of first connector 113. It is additionally noted that a positive voltage rail 507 suitable to power the components of adapter 211 is in electrical connection with Pin 16 316 of first connector 113. In the depicted embodiment, positive voltage rail 507 may be established via pin 316 by drawing electrical charge from a power supply affiliated with a vehicle (such as vehicle 100; see FIG. 2) receiving first connector 113, but other embodiments may comprise an alternative power source, such as a battery or external supply (not shown) without deviating from the teachings disclosed herein. In some embodiments utilizing an Ethernet-compatible connector of the first connector 113 or second connector 119, additional electrical power can be drawn from devices connected to the adapter by Ethernet without deviating from the teachings disclosed herein. The value of positive voltage rail 507 may be any value without deviating from the teachings disclosed herein, but in the depicted embodiment shall advantageously reduce complexity by conforming to the voltage specified by the DOIP protocol for Pin 16 of a J1962 connector.

DOIP protocols may utilize different pin configurations for compatible connectors. Adapter 211 is advantageously suitable to select between two different DOIP pin assignments to maximize compatibility with a variety of pin assignments specified by the DOIP protocol. This selection is accomplished utilizing comparator circuit 501 and multiplexing circuit 503. Comparator circuit 501 identifies which of two DOIP pin configurations is being utilized by an associated vehicle according to signals received from first connector 113. In the depicted embodiment, comparator circuit 501 receives an identification signal from Pin 8 308 via connection 509 in electrical communication with comparator input pin 511.

In the depicted embodiment, the identification signal is exposed to a measurement of comparator circuit 501 via comparator input pin 511 to determine which of two specified impedances are observed by comparator input pin 511, but other embodiments may utilize other signals or different pins of first connector 113 without deviating from the teachings disclosed herein. In the depicted embodiment, a first DOIP pin configuration may exhibit a 3.3 kΩ impedance, and a second DOIP pin configuration may exhibit a 10 kΩ impedance, but other embodiments may comprise other configurations without deviating from the teachings disclosed herein. In an alternative embodiment, a selection switch (not shown) may be provided to allow a user to select which of the DOIP pin configurations should be used by the adapter to provide compatibility with vehicles which do not utilize a pin of first connector 113 for pin configuration selection.

Comparator circuit 501 utilizes the identification signal to generate a control signal to be output via comparator output pin 513 that is transmitted to the multiplexing circuit 503 via connection 515. The control signal is received by the multiplexing circuit 503 via a control input pin 517. Multiplexing circuit 503 then utilizes the control signal to select a source pin from amongst at least two pins from first connector 113. The pins utilized as selectable inputs connect to multiplexing circuit 503 at signal input pin 519 and signal input pin 521. Multiplexing circuit 503 outputs the selected signal via a output signal pin 523, which effectively acts as a destination pin for the signal.

In the depicted embodiment, multiplexing circuit 503 comprises a plurality of control input pins 517, signal input pins 519, and signal input pins 521. Other embodiments may comprise other arrangements without deviating from the teachings disclosed herein.

In the depicted embodiment, control input pin 517a is used to select whether multiplexing circuit 503 will select amongst signal input pin 519a or signal input pin 521a as a first source pin. In the depicted embodiment, signal input pin 519a is electrically connected to Pin 1 301 via connection 525 and signal input pin 521a is electrically connected to Pin 3 303 via connection 527. Control input pin 517b is used to select amongst signal input pin 519b or signal input pin 521b as a second source pin. In the depicted embodiment, signal input pin 519b is electrically connected to Pin 9 309 via connection 529 and signal input pin 521b is electrically connected to Pin 11 311 via connection 531. Other embodiments may comprise other configurations, or a different number of selectable inputs and outputs for the multiplexing circuit without deviating from the teachings disclosed herein.

Multiplexing circuit 503 utilizes output signal pins 523 as destination pins during switching because output signal pins 523 establish electrical communication with associated pins of second connector 119. In the depicted embodiment, multiplexing circuit 503 comprises a plurality of output signal pins 523, but other embodiments may comprise a different number or configuration without deviating from the teachings disclosed herein.

In the depicted embodiment, output signal pin 523a is in electrical communication with Pin 3 403 via connection 533 and output signal pin 523b is in electrical communication with Pin 6 406 via connection 535. Other embodiments may comprise other arrangements without deviating from the teachings disclosed herein.

In this arrangement, multiplexer circuit 503 effectively selects whether Pin 3 403 is electrically connected to Pin 1 301 or Pin 3 303 and whether Pin 6 406 is electrically connected to Pin 9 309 or Pin 11 311, but other embodiments may have other configurations without deviating from the teachings disclosed herein.

It is additionally noted that the same control signal is utilized by control input pins 517a and 517b, meaning the selections of multiplexing circuit 503 are effectively grouped: Pin 1 301 and Pin 9 309 will always be selected for connection together as a first group, and Pin 3 303 and Pin 11 311 will always be selected together as a second group. In other words, multiplexer circuit 503 selects a first source pin from Pin 1 301 and Pin 3 303, and also selects a second source pin from Pin 9 309 and Pin 11 311. In this embodiment, Pin 3 403 will always act as a first destination pin, and Pin 6 406 will always act as a second destination pin. Other embodiments may have other configurations without deviating from the teachings disclosed herein.

In the depicted embodiment, the multiplexing circuit comprises power inputs connected to ground 505 and positive voltage rail 507, but other embodiments may comprise other configurations without deviating from the teachings disclosed herein.

In the depicted embodiment, some of the first pins of first connector 113 are independently connected to corresponding ones of the second pins of second connector 119 irrespective of multiplexing circuit 503 or comparator circuit 501. In this embodiment, Pin 12 312 is always in electrical communication with Pin 1 401 via connection 537, and Pin 13 313 is always in electrical communication with Pin 2 402 via connection 539. Other embodiments may comprise other configurations or arrangements without deviating from the teachings disclosed herein.

Utilizing adapter 211, a diagnostic processor (such as diagnostic processor 109; see FIG. 2) may be configured to receive second connector 119 via compatible port, but rather than expecting a signal conventional to the port type, a DOIP signal may be expected and received instead. By way of example, and not limitation, the depicted embodiment utilizes a second connector 119 conforming to an RJ45 specification, and a corresponding port of a diagnostic processing device may be configured via software to understand the incoming signal from that port as a DOIP signal, rather than an Ethernet signal. Other embodiments may comprise other configurations utilizing other connector types without deviating from the teachings disclosed herein. By way of example, and not limitation, other embodiments may utilize a second connector conforming to a universal serial bus (USB) standard, an IEEE 1394 (also known as "Firewire") protocol, a Thunderbolt protocol, an Lightning connector protocol, or any other data transmission protocol recognized by one of ordinary skill in the art without deviating from the teachings disclosed herein.

Figure 6:
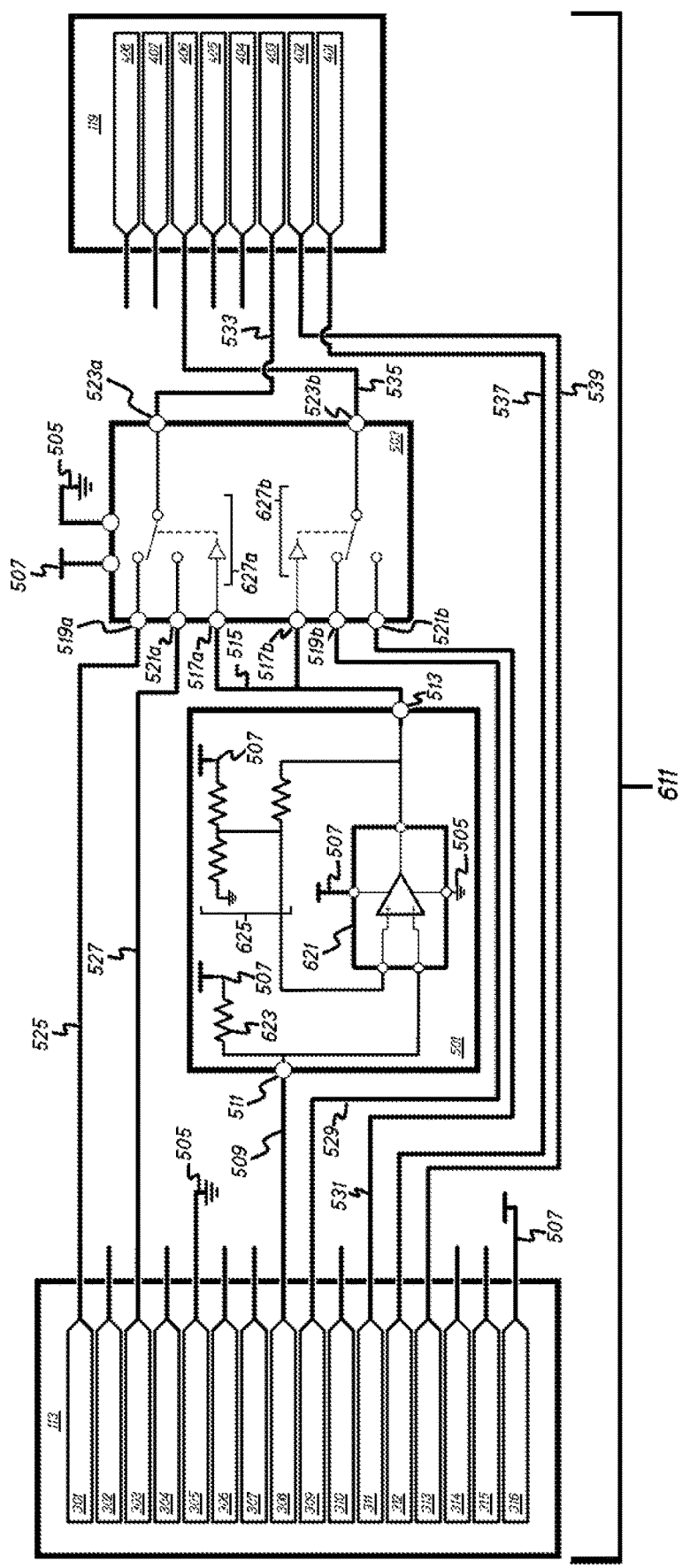
FIG. 6 is a circuit diagram illustrating an adapter circuit to connect a vehicle diagnostics bus with a diagnostic processor utilizing a DOIP protocol.

In the depicted embodiment, comparator circuit 501 and multiplexing circuit 503 are implemented using integrated circuits. FIG. 6 is a circuit diagram illustrating an adapter 611, an implementation of adapter 211 having a particular arrangement and configuration thereof for comparator circuit 501 and multiplexing circuit 503.

In this embodiment, comparator circuit 501 is an integrated circuit comprising an op amp 621 in conjunction with an input resistance 623 and a feedback network 625 to generate a control signal. The control signal is fed to multiplexer circuit 503, which in this embodiment is comprised of a plurality of switching networks 627 controlled by amplified versions of the control signal generated by comparator circuit 501. In this embodiment, switching network 627a selects one of signal input pins 519a and 521a to be electrically connected to output signal pin 523a, and also one of signal input pins 519b and 521b to be electrically connected to output signal pin 523b. Other embodiments may comprise other configurations for the integrated circuits without deviating from the teachings disclosed herein.

Adapter 611, and more broadly adapter 211 (see FIG. 5) advantageously utilizes cost-efficient parts and hardware connections. In some use cases, such as manufacturing and installation of components along an assembly line, it may be desirable to avoid hardwire connections from the adapter to the diagnostic processor. In such embodiments, a wireless connection may advantageously enable movement of the adapter with a vehicle in motion (such as a vehicle being assembled during manufacture and installation of components along an assembly line) without having to accommodate for dynamic cable management between the diagnostic bus and the diagnostic processor.

Figure 7:
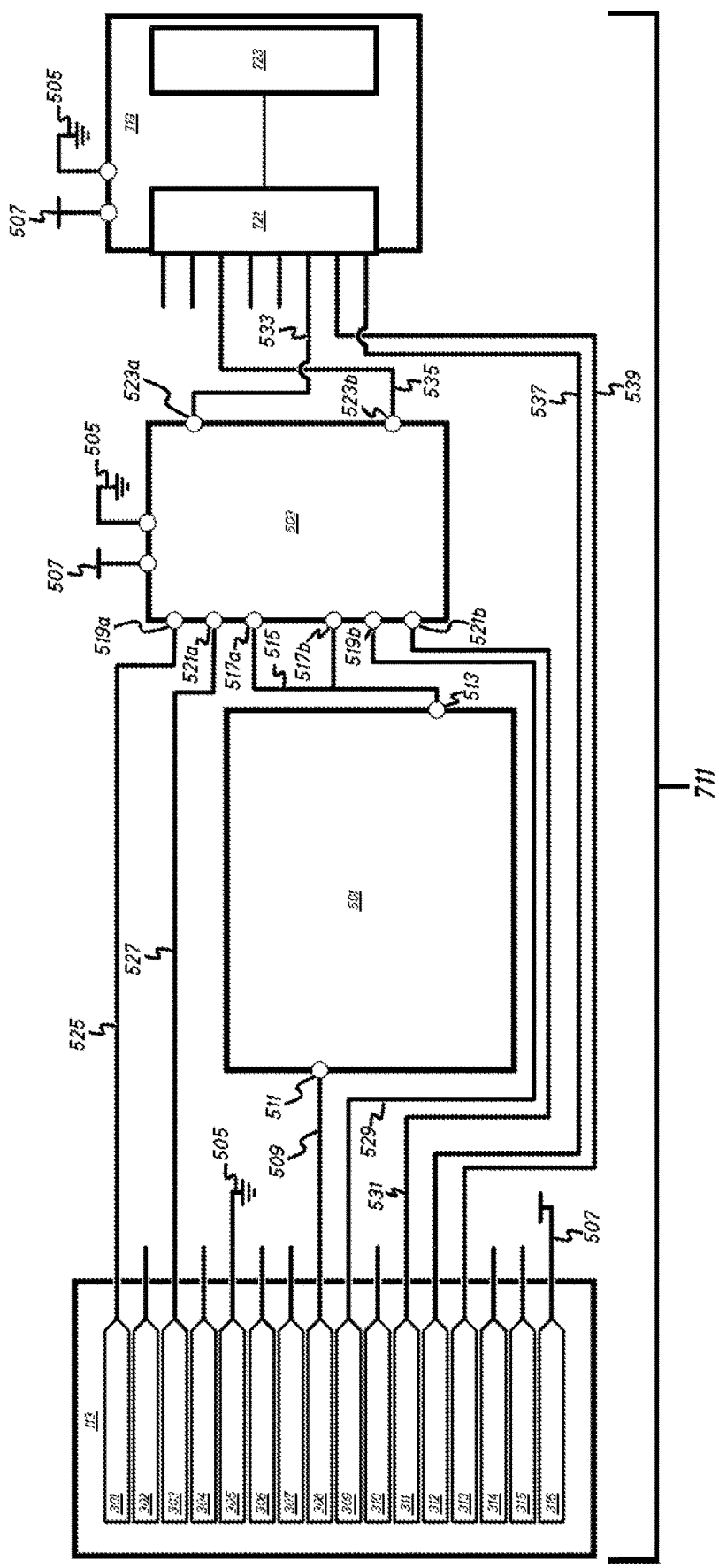
FIG. 7 is a circuit diagram illustrating an adapter circuit to wirelessly connect a vehicle diagnostics bus with a diagnostic processor utilizing a DOIP protocol.

FIG. 7 is a circuit diagram for an adapter 711 that is identical in function to adapter 211 (see FIG. 5) except that instead of a second connector 119 (see FIG. 5) adapter 711 relies upon a multipin transceiver circuit 719. Multipin transceiver circuit 719 has the same number of input pins as second connector 119 (see FIG. 5), including the same layout and optional pins as disclosed above with respect to FIG. 5. However, instead of providing connection to a hardwire cable connection (such as an Ethernet cable), multipin transceiver circuit 719 comprises a microprocessor 721 to receive the pin signals and generate a corresponding transmission signal. Once the transmission signal has been generated, it is received by a transceiver 723 for transmission to an external device, including diagnostic devices (such as diagnostic processor 109 (not shown; see FIG. 1, FIG. 2). Transceiver 723 is additionally configured to receive signals from the external device, which are then passed back to microprocessor 721 to be translated into a DOIP signal for transmission to the vehicle via first connector 113.

Multipin transceiver circuit 719 additionally comprises connections to ground 505 and positive voltage rail 507 in order to provide electric power for microprocessor 721 and transceiver 723. Adapter 711 increases the mobility of the adapter by removing hardware cabling that act as tethers between the vehicle and the external diagnostic device, but does so by increasing complexity and cost compared to adapter 211. However, microprocessor 721 performs a highly-specialized task of formatting data and generating corresponding signals for translation, and more importantly only does so in the context of DOIP-compatible signals. Therefore, transceiver circuit 719 can still be manufactured with reduced complexity and cost compared to a convention VCI (such as VCI 105; see FIG. 1), which will generally have compatibility with a wide variety of diagnostic protocols to justify its expense to the end-user.

In the depicted embodiment, multipin transceiver circuit 719 comprises a single transceiver 723 to both transmit and receive wireless signals, but other embodiments may comprise a distinct transmitter and receiver element without deviating from the teachings disclosed herein.

Figure 8:
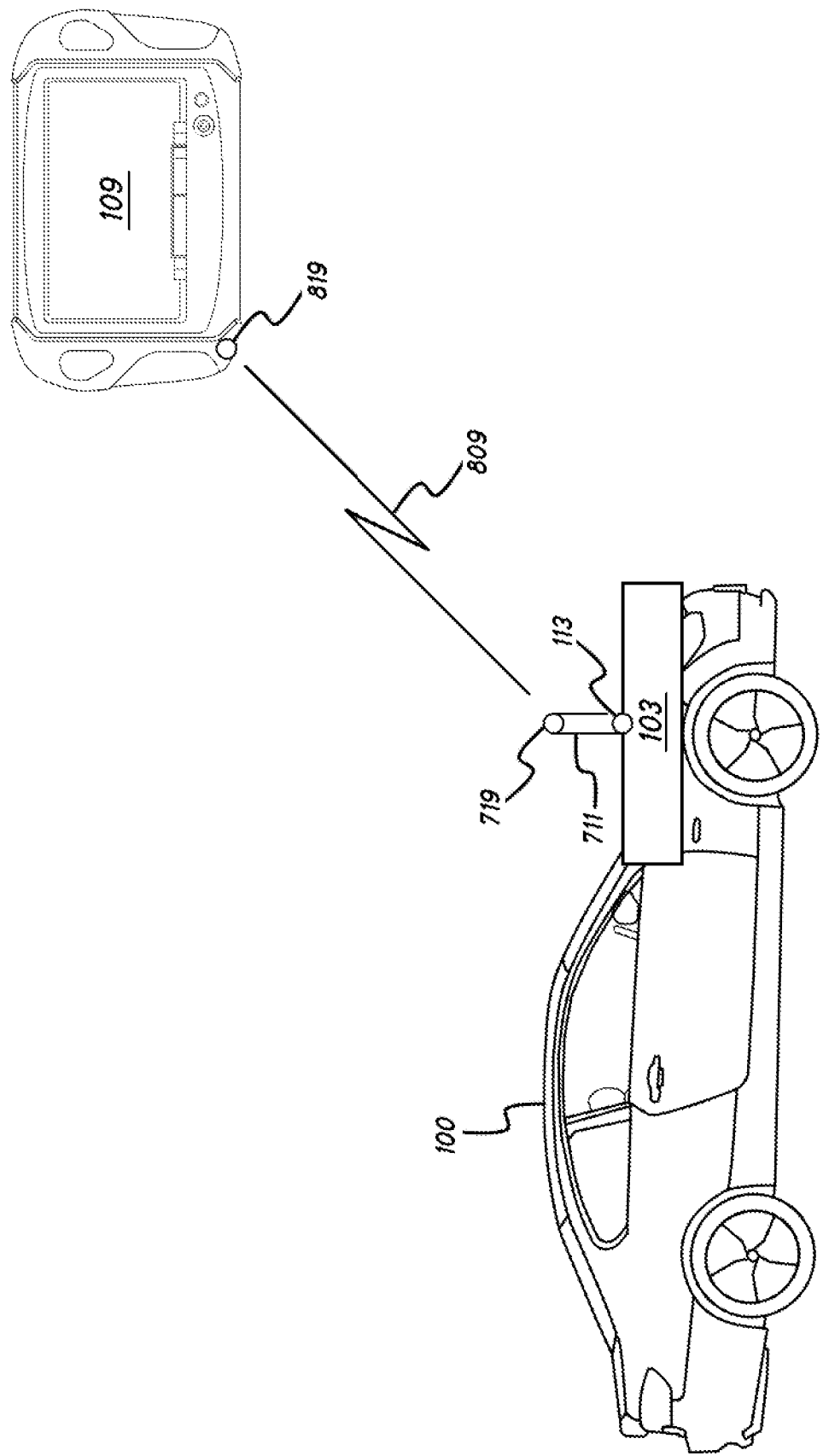
FIG. 8 is a diagrammatic illustration of a diagnostic system utilizing a DOIP adapter to wirelessly connect a vehicle diagnostics bus with a diagnostic protocol utilizing a DOIP protocol.

FIG. 8 is a diagrammatic illustration of a diagnostic system utilizing adapter 711. In this embodiment, multipin transceiver circuit 719 establishes a two-way wireless data communication channel 809 with diagnostic processor 109. Diagnostic processor 109 comprises a transceiver 819 suitable to receive data communications from adapter 711 and transmit data communications (including commands) to adapter 711 as a gateway to diagnostic bus 103. In some embodiments, diagnostic processor 109 may comprise distinct transmitter and receiver elements without deviating from the teachings disclosed herein.

In the depicted embodiment, wireless data communication channel 809 may utilize a protocol suitable for a local area network (LAN) or personal area network. Wireless data communication channel 809 may comprise an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. In the depicted embodiment, wireless data communication channel 809 may comprise a Wi-Fi protocol. In such an embodiment, each of multipin transceiver circuit 719 and transceiver 819 are configured to utilize Wi-Fi communication protocols. In some embodiments, wireless data communication channel 809 may comprise a personal area network protocol, such as a Bluetooth protocol. In such embodiments, each of multipin transceiver circuit 719 and transceiver 819 are configured to utilize Bluetooth communication protocols. Utilization of established communication protocols, such as Wi-Fi or Bluetooth protocols, advantageously permits use of a general-purpose processing device to be programmed for use as diagnostic processor 109, reducing cost and complexity of system implementation.

Figure 9:
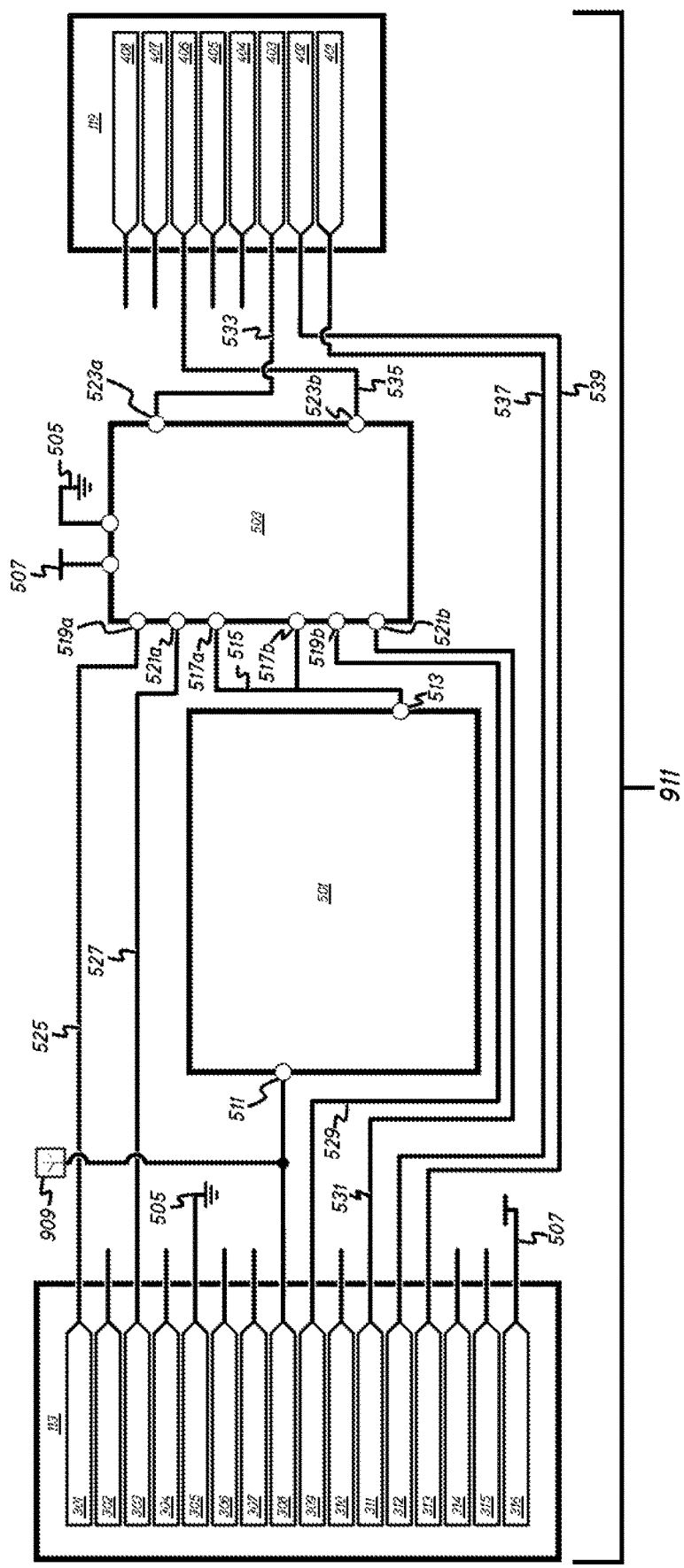
FIG. 9 is a circuit diagram of an adapter circuit to connect a vehicle diagnostics bus with a diagnostic processor utilizing a DOIP protocol.

Some vehicles utilizing a DOIP protocol do not provide a suitable identification signal on a particular pin, and thus some embodiments of an adapter (such as adapter 211; see FIG. 2) cannot readily identify which pin configuration is to be used. FIG. 9 is a circuit diagram illustrating an embodiment of an adapter 911 that comprises additional features to accommodate for these vehicles, advantageously improving the compatibility of adapter 911 with DOIP-compatible diagnostic buses (such as diagnostic bus 103; see FIG. 2). In adapter 911, comparator input pin 511 is still in electrical communication with Pin 8 308 of first connector 113 but is also in electrical communication with a switch circuit 909. Switch circuit 909 provides a manual switch for a user to select an operating mode of the switch circuit 909. In the depicted embodiment, switch circuit 909 comprises three operating modes, each operating mode exposing a different resistor network to comparator input pin 511.

In a first mode of switch circuit 909 exposes a first resistor network to comparator input pin 511 having an impedance matching the impedance expected in a DOIP-connection utilizing a first pin configuration. By way of example, and not limitation, the second mode of switch circuit 909 may expose comparator input pin 511 to a 3.3 kΩ impedance, but other embodiments may comprise other values without deviating from the teachings disclosed herein.

The second mode of switch circuit 909 exposes a second resistor network to comparator input pin 511 having an impedance matching the impedance expected in a DOIP-connection utilizing a second pin configuration. By way of example, and not limitation, the second mode of switch circuit 909 may expose comparator input pin 511 to a 10 kΩ impedance, but other embodiments may comprise other values without deviating from the teachings disclosed herein.

In a third mode, switch circuit 909 exposes an open connection to comparator input pin 511, effectively exposing the input to an infinite resistance in parallel with Pin 8 308. This mode provides an effective "auto-select compatible" mode to enable compatibility of adapter 911 with DOIP-compatible vehicles that provide identification signals suitable for comparator circuit 501 on Pin 8 308.

A user of adapter 911 may manually select the mode of operation for the adapter via control of the status of the manual switch of switch circuit 909. If the status of the manual switch exposes the first resistor network, comparator circuit 501 will identify a first pin configuration in response when no other signal is presented by first connector 113. If the status of the manual switch exposes the second resistor network, comparator circuit 501 will identify a second pin configuration in response when no other signal is presented by first connector 113. If the status of the manual switch exposes the open connection, the comparator circuit 501 will identity a pin configuration for use by adapter 911 based only upon signals presented by Pin 8 308 of first connector 113. Other embodiments may comprise a different number of modes of operation, a different number of switch statuses, a different pin of first connector 113 providing signal to comparator circuit 501, or some combination of these alternatives without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

The invention claimed is:

1. A diagnostic over internet protocol (DOIP) adapter, the adapter comprising:
   a first connector having a set of first pins and configured to interface with a vehicle diagnostic bus utilizing a DOIP protocol;
   a second connector having a set of second pins and configured to interface with a diagnostic processor;
   a comparator circuit configured to generate a control signal indicating a DOIP pin configuration received by the first connector; and
   a multiplexing circuit configured to selectively connect one of the first pins to one of the second pins in response to the control signal,
   wherein
   a subset of the first pins is connected to a corresponding subset of the second pins independently of the multiplexing circuit.

2. The DOIP adapter of claim 1, wherein the first connector comprises a J1962 connector.

3. The DOIP adapter of claim 2, wherein Pin 8 of the first connector provides an input signal to the comparator circuit.

4. The DOIP adapter of claim 2, wherein the multiplexing circuit selects one of Pin 1 and Pin 3 of the first connector as a first source pin in response to the control signal and connects the first source pin to a first destination pin of the second pins.

5. The DOIP adapter of claim 4, wherein the multiplexing circuit selects one of Pin 9 and Pin 11 of the first connector as a second source pin in response to the control signal and connects the second source pin to a second destination pin of the second pins.

6. The DOIP adapter of claim 1, wherein the second connector comprises an RJ45 connector.

7. The DOIP adapter of claim 6, wherein the first connector is a J1962 connector.

8. The DOIP adapter of claim 7, wherein the multiplexing circuit selects one of Pin 1 and Pin 3 of the first connector as a source pin in response to the control signal, and connects the source pin to Pin 3 of the second connector.

9. The DOIP adapter of claim 7, wherein the multiplexing circuit selects one of Pin 9 and Pin 11 of the first connector as a source pin in response to the control signal, and connects the source pin to Pin 6 of the second connector.

10. The DOIP adapter of claim 7, wherein Pin 12 of the first connector is connected to Pin 1 of the second connector independently of the multiplexing circuit.

11. The DOIP adapter of claim 7, wherein Pin 13 of the first connector is connected to Pin 2 of the second connector independently of the multiplexing circuit.

12. The DOIP adapter of claim 1, wherein the comparator circuit generates the control signal in response to the status of a switch in electrical communication with an input of the comparator circuit.

13. A diagnostic over internet protocol (DOIP) adapter, the adapter comprising:
- a first connector having a plurality of first pins and configured to interface with a vehicle diagnostic bus utilizing a DOIP protocol;
- a multipin transceiver circuit having a set of second pins and configured to wirelessly transmit and receive data with a diagnostic processor;
- a comparator circuit configured to generate a switching signal indicating a DOIP pin configuration received by the first connector; and
- a multiplexing circuit configured to selectively connect one of the first pins to one of the second pins in response to the switching signal, wherein
- at least one of the first pins is connected to a corresponding one of the second pins independently of the multiplexing circuit.

14. The DOIP adapter of claim 13, wherein the multipin transceiver circuit is configured to establish communication with the diagnostic processor utilizing a local area network protocol.

15. The DOIP adapter of claim 14, wherein the multipin transceiver circuit is configured to establish communication with the diagnostic processor utilizing a Wi-Fi protocol.

16. The DOIP adapter of claim 13, wherein the multipin transceiver circuit is configured to establish communication with the diagnostic processor utilizing a Bluetooth protocol.

17. A diagnostic system comprising:
- a diagnostic processor; and
- a diagnostics over internet protocol (DOIP) adapter having
  - a first connector having a set of first pins and configured to interface with a vehicle diagnostic bus utilizing a DOIP protocol;
  - a second connector having a set of second pins and configured to interface with a diagnostic processor;
  - a comparator circuit configured to generate a control signal indicating a DOIP pin configuration received by the first connector; and
  - a multiplexing circuit configured to selectively connect one of the first pins to one of the second pins in response to the control signal, wherein
  - a subset of the first pins is connected to a corresponding subset of the second pins independently of the multiplexing circuit.

18. The diagnostic system of claim 17, wherein the first connector comprises a J1962 connector and the second connector comprises an RJ45 connector.

19. The diagnostic system of claim 18, wherein, in response to the control signal, the multiplexing circuit selects one of Pin 1 and Pin 3 of the first connector as a first source pin and selects one of Pin 9 and Pin 11 of the first connector as a second source pin, and connects the first source pin to Pin 3 of the second connector and connects the second source pin to Pin 6 of the second connector.

20. The diagnostic system of claim 18, wherein Pin 8 of the first connector provides an input signal to the comparator circuit.

* * * * *